(12) United States Patent
Kasai

(10) Patent No.: US 9,467,323 B2
(45) Date of Patent: Oct. 11, 2016

(54) COMMUNICATION DEVICE AND A CONTROL METHOD THEREFOR THAT PERFORM AUTHENTICATION USING DIGITAL CERTIFICATES

(71) Applicant: Seiko Epson Corporation, Tokyo (JP)

(72) Inventor: Eiji Kasai, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/704,041

(22) Filed: May 5, 2015

(65) Prior Publication Data
US 2015/0334109 A1 Nov. 19, 2015

(30) Foreign Application Priority Data

May 19, 2014 (JP) .................................. 2014-103140
Mar. 4, 2015 (JP) .................................. 2015-042099

(51) Int. Cl.
*H04L 29/06* (2006.01)
*G06F 3/12* (2006.01)
*H04L 9/32* (2006.01)

(52) U.S. Cl.
CPC ............ *H04L 29/06* (2013.01); *G06F 3/1204* (2013.01); *G06F 3/1222* (2013.01); *G06F 3/1236* (2013.01); *G06F 3/1238* (2013.01); *G06F 3/1296* (2013.01); *G06F 3/1297* (2013.01); *H04L 9/3268* (2013.01); *H04L 63/0823* (2013.01); *H04L 67/42* (2013.01)

(58) Field of Classification Search
None
See application file for complete search history.

(56) References Cited

U.S. PATENT DOCUMENTS

| | | | |
|---|---|---|---|
| 5,615,268 A | 3/1997 | Bisbee et al. | |
| 5,748,738 A | 5/1998 | Bisbee et al. | |
| 6,237,096 B1 | 5/2001 | Bisbee et al. | |
| 6,367,013 B1 | 4/2002 | Bisbee et al. | |
| 6,889,212 B1 * | 5/2005 | Wang | G06Q 30/06 370/259 |
| 7,134,144 B2 * | 11/2006 | McKune | G06F 21/10 713/187 |
| 2001/0002485 A1 | 5/2001 | Bisbee et al. | |
| 2003/0140226 A1 * | 7/2003 | Yamamoto | H04L 63/0823 713/156 |
| 2004/0093493 A1 | 5/2004 | Bisbee et al. | |
| 2006/0005239 A1 * | 1/2006 | Mondri | H04L 9/3263 726/13 |
| 2006/0080536 A1 * | 4/2006 | Teppler | H04L 9/12 713/176 |
| 2007/0234053 A1 * | 10/2007 | Kudo | H04L 9/3263 713/169 |
| 2008/0307494 A1 * | 12/2008 | Holtzman | G06F 21/10 726/2 |

(Continued)

FOREIGN PATENT DOCUMENTS

JP 2004013374 A * 1/2004
JP 2005-262817 A 9/2005

(Continued)

*Primary Examiner* — Thomas D Lee

(57) ABSTRACT

A communication device having time information that may not be correct can efficiently and accurately authenticate a server certificate. The communication unit of a printer processes server authentication that inspects a server certificate when connecting to an external network. Server authentication includes a first authentication that verifies the validity period of the server certificate based on status information and time information stored by the communication unit. The communication unit cuts the connection to the external network if the time information stored by the communication unit is after the validity period (the validity period is clearly expired). The first authentication reliably succeeds if the communication unit has the correct time information and a valid server certificate. If the time information is before the validity period, the time information may be old, and processing proceeds based on the status information.

20 Claims, 5 Drawing Sheets

(56) References Cited

U.S. PATENT DOCUMENTS

2012/0233680 A1* 9/2012 Ota .................. G09C 5/00
                                                726/7
2013/0254535 A1* 9/2013 Akehurst ............ H04L 29/06
                                              713/158

FOREIGN PATENT DOCUMENTS

| | | |
|---|---|---|
| JP | 2006-197057 A | 7/2006 |
| JP | 2010-193158 A | 9/2010 |
| KR | 2006-0114553 A | 11/2006 |
| KR | 10-1105121 B | 1/2012 |

* cited by examiner

COMMUNICATION DEVICE AND A CONTROL METHOD THEREFOR THAT PERFORM AUTHENTICATION USING DIGITAL CERTIFICATES

Priority is claimed under 35 U.S.C. §119 from Japanese patent application nos. JP 2014-103140 filed on May 19, 2014 and JP 2015-42099 filed on Mar. 4, 2015, which are hereby incorporated by reference in their entirety.

BACKGROUND

1. Technical Field

The present disclosure relates to technology enabling authentication between server and client devices using digital certificates when connecting to a network. More particularly, the invention relates to a communication device, a printer, and a control method therefore that perform authentication using digital certificates.

2. Related Art

When connecting to a network, devices (client devices) that send and receive data through the network may use various methods of authentication using digital certificates with an authentication server. For example, in authentication using the EAP-TLS authentication protocol, the client performs client-side server authentication that inspects the authentication server when the client connects to a network. For server authentication, the client inspects the server certificate, which is the digital certificate of the authentication server. The server certificate contains information such as the validation period and signature of the certificate authority, and the client inspects the content of the server certificate. If the client successfully authenticates the server certificate, and the authentication server successfully authenticates the client, the network connection service starts. The server certificate is provided to the client in advance by some other means.

During server authentication, the client verifies if the server certificate is valid or has expired. This validation test checks if the validity period contained in the server certificate matches the time information (current time) maintained by the client. More specifically, the client determines if the current time is a time within the validity period of the server certificate. If the client has an internal clock, the client can use the time indicated by the internal clock for testing the validity period. However, if the internal clock of the client stops when the power turns off, for example, the time indicated by the internal clock when the client turns on again may differ from the correct current time. When this happens, the validity period cannot be correctly tested, and a server certificate that has exceeded the validity period (has expired) may be erroneously determined to still be valid. If the internal clock of the client is simply wrong, a server certificate with an impossible validity period (such as a server certificate that has not been issued yet and has a validity period in the future) may be erroneously determined to be valid.

When the client has an internal clock that is not operating correctly or the client does not have an internal clock, the client cannot correctly check the validity period using only information on the client side. The client must therefore be able to acquire the correct current time by some means. One source of correct current time information is an NTP server connected to the network, but a client that cannot connect to the network unless server authentication is successful cannot acquire the current time from an NTP server on the network.

To solve this problem, JP-A-2010-193158 describes a client that, when it does not have the correct current time information, performs a temporary authentication that checks the trustworthiness of other information without verifying the validity period, and if this temporary authentication is successful, connects to the network and acquires the correct time information from a time server on the network. The client then checks the trustworthiness of the server certificate by attempting normal authentication including testing the validity period using the acquired time information.

In the authentication method disclosed in JP-A-2010-193158, the correct current time can be acquired through the network, and the validity period can be tested based on this time. The validity period of the server certificate can therefore be correctly verified even when the client does not have an internal clock or the time kept by the internal clock is wrong, and security can be assured when connecting to a network. However, with the method disclosed in JP-A-2010-193158, the client connects to the network without verifying the validity period of the server certificate. The client can therefore connect to the network even when a server certificate that is no longer valid is received, and security can therefore not be assured. In addition, because the client connects to the network to detect if the validity period has expired, processing time is wasted and efficiency is poor.

In addition to the two-step authentication method described in JP-A-2010-193158, another method of testing the validity period requires the network administrator to inform the user of a client device that connects to the network of a time within the validity period of the server certificate, and the user to manually set the time. If the reported time is stored and saved on the client, time verification will not fail until the server certificate is updated, and normal authentication alone will suffice. However, every time the server certificate is renewed with this method, the users must manually update the time setting on all of the many clients using the same server certificate. This imposes a heavy burden on the users, and increases operating costs.

SUMMARY

An objective of the present invention is to enable a client (communication device) that may not internally have the correct time to efficiently and correctly authenticate a server certificate, and ensure security when connecting to a network without creating more work for the user.

To achieve the foregoing objective, a control method of a communication device that performs server authentication and inspects a server certificate, which is a digital certificate with a set validity period, when connecting to a network, includes: the communication device storing time information and status information, which indicates whether the time information is a provisional time or verified time; doing a first authentication that determines during server authentication if the time indicated by the time information is before the start time of the validity period, during the validity period, or after the validity period ends; stopping connecting to the network using the server certificate if the first authentication determines that the time indicated by the time information is after the validity period ends; attempting a second authentication that inspects other authentication information included in the server certificate if the first authentication determines that the time indicated by the time information is during the validity period; executing a preset process based on the status information if the first authentication determines that the time indicated by the time information is before the start time of the validity period and the status information is set to provisional time; and stopping connection to the network if the first authentication determines that the time indicated by the time information is before the start time of the validity period and the status information is set to verified time.

A communication device according to another aspect of the invention includes: a time management unit that manages time information and status information, which indicates whether the time information is a provisional time or verified time; and an authentication unit that processes server authentication to inspect a server certificate, which is a digital certificate with a set validity period, when connecting to a network. The authentication unit executes a first authentication that determines during server authentication if the time indicated by the time information is before the start time of the validity period, during the validity period, or after the validity period ends; stops connecting to the network using the server certificate if the first authentication determines that the time indicated by the time information is after the validity period ends; attempts a second authentication that inspects other authentication information included in the server certificate if the first authentication determines that the time indicated by the time information is during the validity period; executes a preset process based on the status information if the first authentication determines that the time indicated by the time information is before the start time of the validity period and the status information is set to provisional time; and stops connection to the network if the first authentication determines that the time indicated by the time information is before the start time of the validity period and the status information is set to verified time.

Another aspect of the invention is a printer including: a communication unit that manages time information and status information, which indicates whether the time information is a provisional time or verified time, and processes server authentication to inspect a server certificate, which is a digital certificate with a set validity period, when connecting to a network; a print unit that prints on print media based on data received through the communication unit. The communication unit executes a first authentication that determines during server authentication if the time indicated by the time information is before the start time of the validity period, during the validity period, or after the validity period ends; stops connecting to the network using the server certificate if the first authentication determines that the time indicated by the time information is after the validity period ends; attempts a second authentication that inspects other authentication information included in the server certificate if the first authentication determines that the time indicated by the time information is during the validity period; executes a preset process based on the status information if the first authentication determines that the time indicated by the time information is before the start time of the validity period and the status information is set to provisional time; and stops connection to the network if the first authentication determines that the time indicated by the time information is before the start time of the validity period and the status information is set to verified time.

During server authentication, which is a condition for connecting to a network, the communication device compares the time indicated by time information stored by the communication device with the validity period of the server certificate, and then executes a process appropriate to the result. More specifically, if the time information stored by the communication device is after the validity period and the validity period has clearly expired, the communication device immediately interrupts connection to the network using the server certificate and prevents unnecessary processing. If the time information is correct and the server certificate is valid, the time validation (first authentication) reliably succeeds.

If the time information denotes a time before the validity period and the time information maybe old for some reason, the time information may actually be within the validity period. As a result, a process appropriate to the status information for the time information is executed, and connecting to the external network 4 can be attempted.

The status of the time information is set to provisional time if, for example, the time information has not been synchronized with the correct current time acquired from an external source, and is set to verified time if the time information has been synchronized with the correct current time. The validity of the server certificate can therefore be inspected more accurately and efficiently than in the related art. Assuring security when connecting to a network can therefore be balanced with connecting to the network efficiently. The work load of the user is therefore not increased and increased operating cost can be avoided.

If the time information may be old (if the status information is set to provisional time), attempting to connect to the network can continue. Being unable to connect to the network because the time information is old even though the server certificate is valid can therefore be avoided. If the time information has already been updated (the status information is set to verified time), connecting to the network is terminated because the validity period of the server certificate is clearly set to a time that is not possible. The validity of the server certificate can therefore be inspected more accurately and efficiently than in the related art.

In the communication device, control method, and printer according to other aspects of the invention, the preset process is preferably a provisional setting process that sets the time information to information indicating a preset time in the validity period; and attempts the second authentication after the provisional setting process.

Thus comprised, if the time information is old and the server certificate maybe valid, processing can go to the second authentication to attempt to connect to the network. Problems such as being unable to connect to the network because there is no internal clock or the internal clock stopped for some reason even though the server certificate is valid can be avoided. There is also no need for the user to manually set the time information to a value within the validity period. The user's work load is therefore not increased, and an increase in the operating cost can be avoided.

Further preferably in a communication device and control method according to other aspects of the invention, a process of setting the time information to a previously stored startup time, and a process of setting the status information to provisional time, are executed before the first authentication step.

Thus comprised, because the status information is set to provisional time when the time information is set based on the startup time, whether or not the time information may be old information can be determined from the status information. Attempting to connect to the network can therefore continue when the server certificate might be valid.

Further preferably when connection to the network using the server certificate is enabled, a communication device, control method, and printer according to other aspects of the invention execute a time updating process that updates the time information to a current time acquired through the network, and then updates the startup time to the time information if the status information is set to verified time and the time difference between the time information and the startup time is greater than or equal to a preset threshold.

Thus comprised, the time information can be updated to the correct current time acquired from a time server (NTP server) on the network, and the startup time stored by the communication device can also be updated. Server authentication can thereafter proceed based on time information synchronized to the correct current time. Problems resulting from the startup time being set to old time information can also be avoided. The validity period of the server certificate can therefore be accurately and efficiently inspected. Furthermore, because unnecessarily frequently updating the startup time can be avoided, the number of write operations to the storage medium storing the startup time can be reduced, and the service life of the storage medium can be increased.

Further preferably when connection to the network using the server certificate is enabled, a communication device, control method, and printer according to other aspects of the invention execute a time updating process that updates the time information to a current time acquired through the network, change the status information to verified time if the status information is set to provisional time, and then cut the network connection and attempting the first authentication using the updated time information.

Thus comprised, the time information can be updated to the correct current time acquired from a time server (NTP server) on the network. That the time information was updated to the correct current time can also be determined from the status information. The validity period of the server certificate can therefore be inspected more accurately and efficiently.

Further preferably, a communication device, control method, and printer according to other aspects of the invention update the time information to the received current time when information indicating the current time is received without accessing the network; and then change the status information to verified time if the status information is set to provisional time.

Thus comprised, when the correct time information can be acquired without using a network connection, the time information can be updated and the status information changed to verified time, and server authentication can thereafter be done based on time information synchronized to the correct current time. Accurate time information can be acquired without going through a network connection by, for example, receiving radio signals carrying time information, including radio signals carrying GPS information, beacon signals, and time signals for radio-control timepieces, radio signals transmitted from cell phone base stations, and radio signals carrying digital television signals or multiplexed FM broadcasts. If time information can be acquired from a device on a local area network, that information may also be used.

Further preferably in printer according to other aspects of the invention, the print unit that prints a message on the print medium indicating the network connection was interrupted when the connection is interrupted.

Further preferably in printer according to other aspects of the invention, the print unit that when connected to the network, prints on the print medium based on print data received from a device on the network.

By thus printing a message when the network connection is interrupted, the burden on the user can be reduced when connecting to a network. Printing over a network while maintaining a secure network connection is also possible without increasing the burden on the user.

Other objects and attainments together with a fuller understanding of the invention will become apparent and appreciated by referring to the following description and claims taken in conjunction with the accompanying drawings.

DESCRIPTION OF EMBODIMENTS

Printing System

Figure 1:
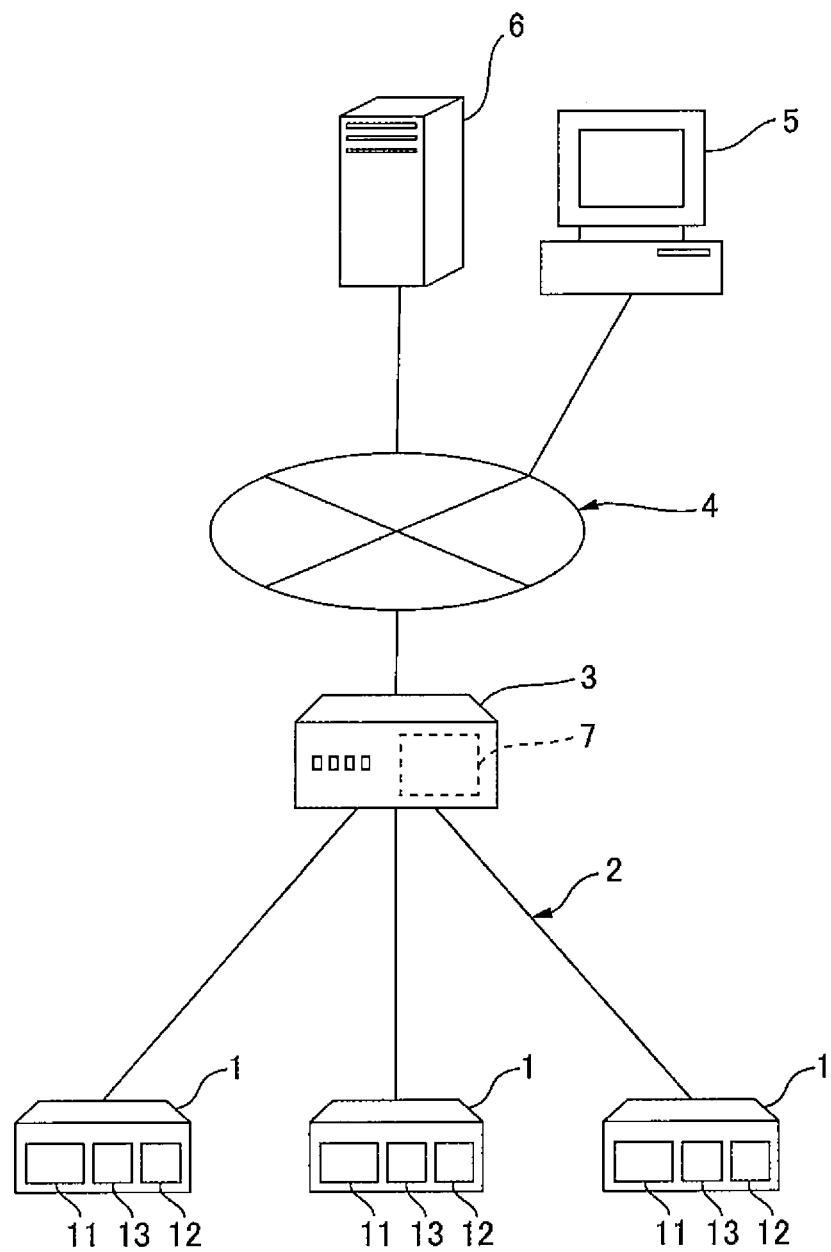
FIG. 1 illustrates the general configuration of a printing system including a printer with a communication device according to the invention.

FIG. 1 illustrates the general configuration of a printing system including a printer with a communication device according to some embodiments of the invention. The printer 1 is a mobile printer, and has a communication unit 11 (communication device), a print unit 12 that prints data received from the communication unit 11 on a print medium, and a control unit 13 that controls the communication unit 11 and print unit 12.

The print unit 12 includes a printhead and a conveyance mechanism that conveys the print medium past the print position of the printhead. The printer 1 can connect through the communication unit 11 to a local area network (LAN) 2, which is a wired or wireless communication network. The local area network 2 is a communication network conforming to a standard protocol such as IEEE 802.11, and multiple printers 1 can connect to the local area network 2. The printers 1 are not limited to mobile printers, and other types of printers may be used.

A printer 1 on the local area network 2 can connect through a router 3 to an external network 4 (network). The external network 4 is a communication network (such as the Internet) that uses the Internet protocol (IP). A management server 5 and an NTP server 6 are connected to the external network 4. The management server 5 is, for example, a server that manages data processed by the printer 1. The NTP server 6 is a server that provides time synchronization for communication devices that can connect to the external network 4 using NTP (Network Time Protocol).

When securely connecting to the external network 4, a printer 1 on the local area network 2 first performs authentication to establish encrypted communication. The router 3 in this example is a device with a router function and a server program, and can function as an authentication server 7. Alternatively, the router 3 maybe configured to perform authentication by communicating with an authentication server connected to the local area network 2 or the external network 4. Further alternatively, the router 3 and printer 1 may connect through an access point. In this event, the access point also functions as the authentication server, or can connect to a device with the authentication server function.

Authentication when connecting to the external network 4 is mutual authentication, specifically the printer 1 executing a server authentication process that determines the trustworthiness of the authentication server 7 (server), and the authentication server 7 executing a client authentication process that determines the trustworthiness of the printer 1 (client). The EAP-TLS (Extensible Authentication Protocol-Transport Layer Security) authentication protocol is one example of a mutual authentication method. The EAP-TLS authentication protocol uses digital certificates for server authentication and client authentication. In server authentication, the printer 1 inspects the server certificate 8, which is a digital certificate verifying the trustworthiness of the authentication server 7. In client authentication, the authentication server 7 inspects the client certificate, which is a digital certificate that verifies the trustworthiness of the printer 1. Alternatively, a method in which server authentication is done with a digital certificate, and client authentication is done using a user ID and password, for example, may be used. Mutual authentication succeeds when both server authentication and client authentication succeed.

Figure 2:
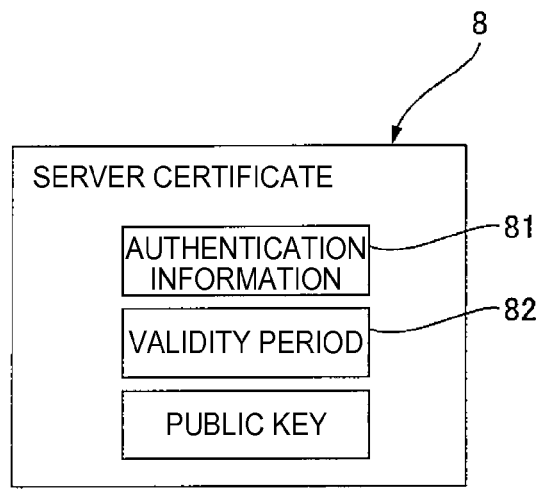
FIG. 2 is a block diagram illustrating a server certificate.

FIG. 2 illustrates a server certificate 8. The server certificate 8 is a digital certificate that has been verified by a trusted certificate authority, and includes authentication information 81 including a signature identifying the authentication server 7. A validity period 82 is also set in the server certificate 8, and contains information identifying the validity period 82. The server certificate 8 also includes information such as a public key used for data encryption. The validity period 82 is set for a specific period of time such as plural months or one year. The server certificate 8 is installed on the printer 1 from the authentication server 7. Alternatively, the user can manually install the server certificate 8 on the printer 1. A new server certificate 8 is issued and supplied to the printer 1 or the user before the validity period 82 ends.

Communication Unit

Figure 3:
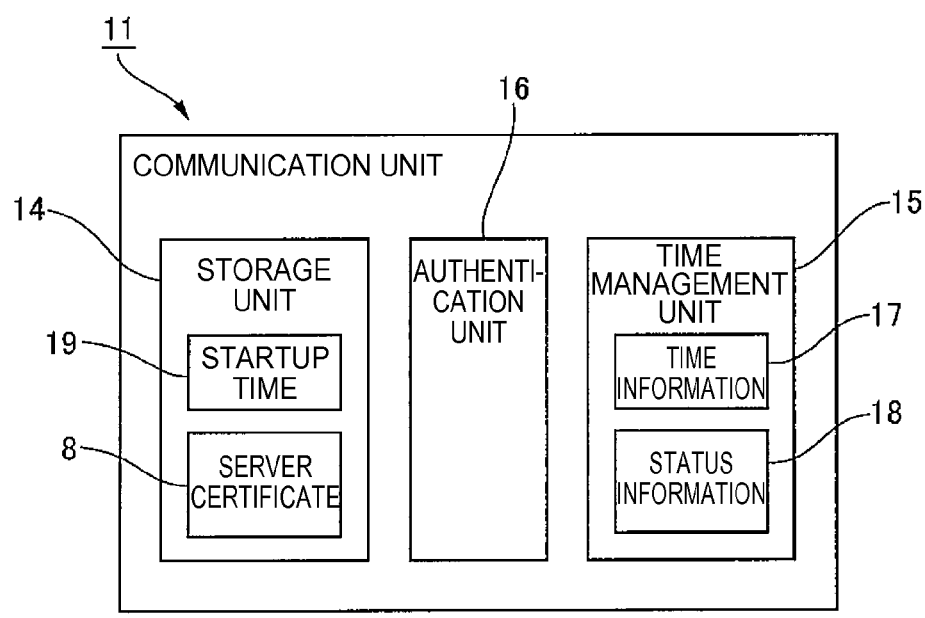
FIG. 3 is a block diagram illustrating the main parts of the communication unit.

FIG. 3 is a block diagram showing the main parts of the communication unit 11 of the printer 1. The communication unit 11 includes a storage unit 14, time management unit 15, and authentication unit 16.

The storage unit 14 stores data including the server certificate 8 and startup time 19. The startup time 19 is previously set time information, and is information identifying a specific point in time. The startup time 19 may be set during the manufacturing process, or set by the user after shipping. As described further below, if the printer 1 can acquire the correct current time from an NTP server 6 on the external network 4, for example, a startup time 19 update process is executed by the time management unit 15.

The time management unit 15 sets and manages the time information 17 and status information 18. The time information 17 is information identifying a specific time on a time base. The status information 18 is information indicating whether or not the time information 17 is a time synchronized with the NTP server 6, and is set as either a provisional time (a time not synchronized with the server) or a verified time (a time synchronized with the server). When the communication unit 11 is started by a external network 4 connection request, the time information 17 and status information 18 are set by the time management unit 15 based on the startup time 19 stored in the storage unit 14. If the printer 1 does not have an internal clock, the communication unit 11 handles server authentication based on the time information 17 managed by the time management unit 15 as described further below.

During server authentication and connecting to the external network 4, the time management unit 15 also runs processes for updating the time information 17 and changing the status information 18. For example, when connecting to the NTP server 6 through the external network 4 is possible, the time management unit 15 runs a time updating process that gets the correct current time from the NTP server 6, and rewrites the stored time information 17 to the newly acquired current time. When this time updating process executes, the time management unit 15 runs another process to change the status information 18 from provisional time to verified time. When the time updating process executes, the time management unit 15 also runs a process that updates the startup time 19 to the time information 17 (that is, the correct current time) according to the status information 18.

The authentication unit 16 also handles server authentication, which is the client-side (that is, communication unit 11 side) authentication process of mutual authentication. The communication unit 11 may be an expansion card such as a network card that is removably installed to the printer 1, or the communication unit 11 may be built into the printer 1.

Server Authentication

Figure 4:
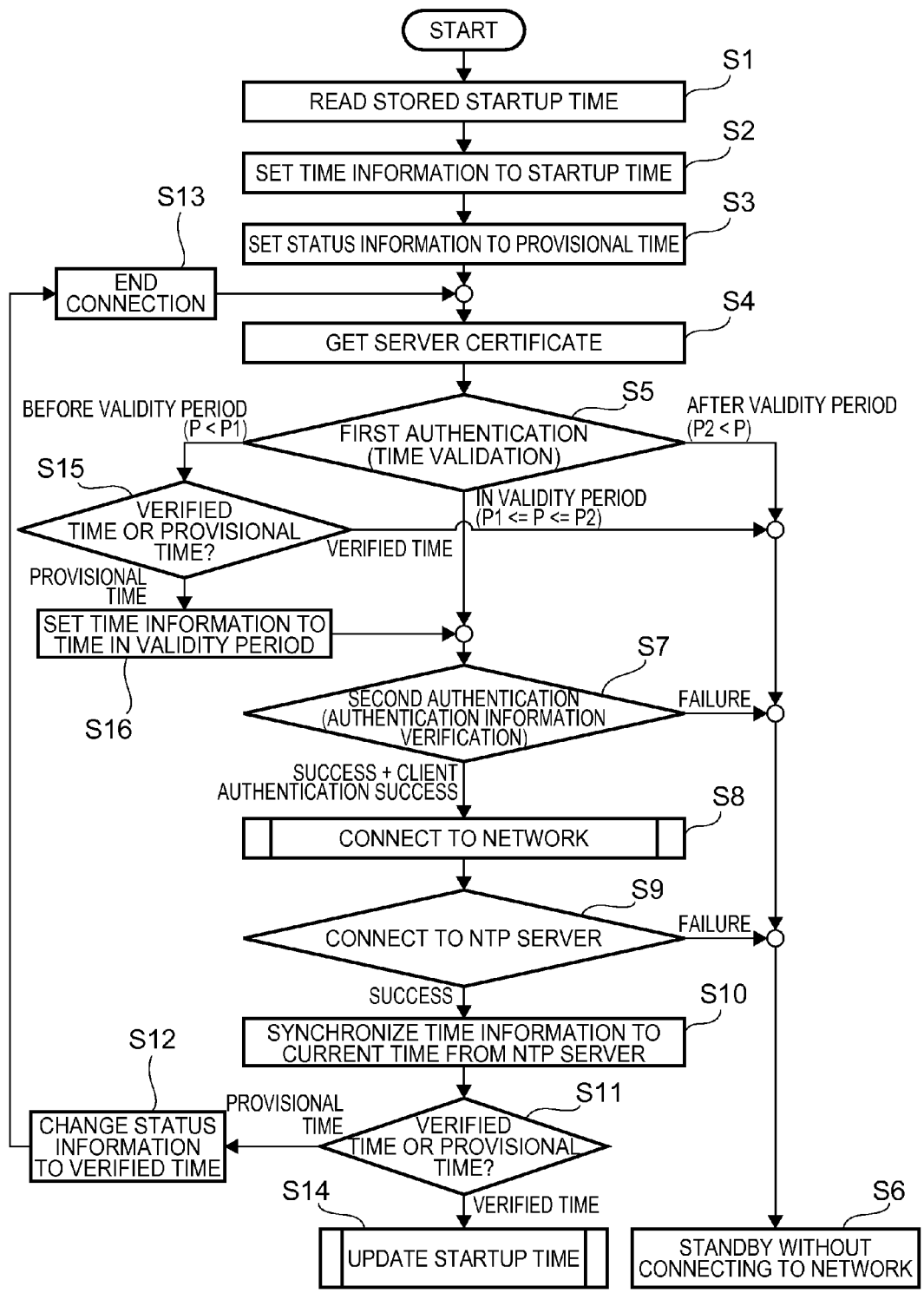
FIG. 4 is a flow chart of the server authentication process.

FIG. 4 is a flow chart of the server authentication process. When a request to connect to the external network 4 is received from the control unit 13 of the printer 1, the communication unit 11 starts and executes the server authentication process. First, the time management unit 15 sets the time information 17 and status information 18 (steps S1 to S2). More specifically, the time management unit 15 reads the startup time 19 from the storage unit 14 (step S1). Next, the time management unit 15 sets the time information 17 to the same time as the startup time 19 that was read and saves the time information 17 (step S2). The time management unit 15 then sets the status information 18 to the provisional time (step S3).

The authentication unit 16 then starts server authentication. The authentication unit 16 first gets the server certificate 8 from the authentication server 7 (step S4). Note that in step S4 the authentication unit 16 may read the server certificate 8 stored in the storage unit 14. Next, the authentication unit 16 attempts a first authentication (step S5). This first authentication verifies the time-based validity of the server certificate 8 by comparing the validity period 82 of the server certificate 8 with the time information 17 stored by the time management unit 15.

Figure 5:
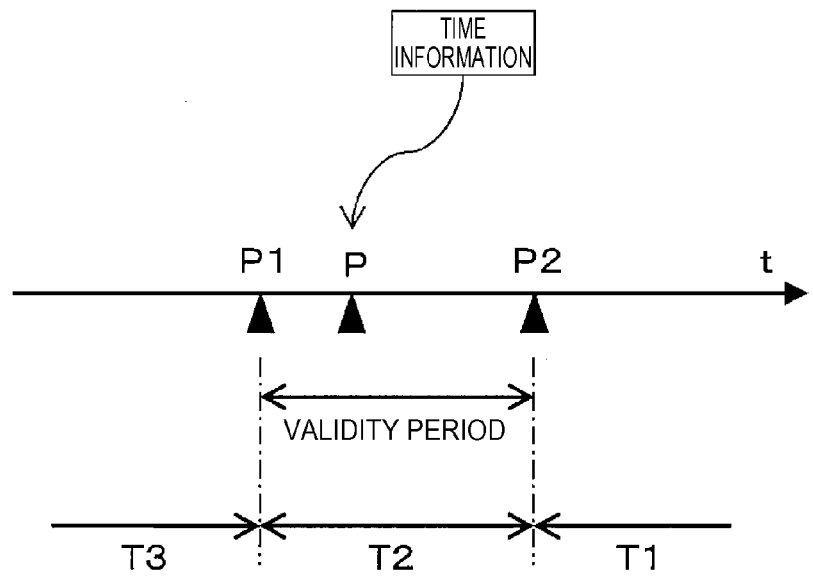
FIG. 5 illustrates validity period verification.

FIG. 5 illustrates this time-based validation step. In FIG. 5, P1 is the start time of the validity period 82, and P2 is the end time of the validity period 82. Point P is the time indicated by the time information 17 stored by the time management unit 15. In the first authentication (time-based validation), the authentication unit 16 determines which of three periods the time P indicated by the time information 17 is in: a first period T1 that is after the end time P2 (that is, after the validity period 82), a second period T2 that is from the start time P1 to the end time P2 (that is, within the validity period 82), or a third period T3 that is before the start time P1 (that is, before the validity period 82). FIG. 5 shows an example in which the time P indicated by the time information 17 is within the validity period 82.

(1) If the Time Information is After the Validity Period (in First Period T1)

If in the first authentication the time P indicated by the time information 17 is in the first period T1 (step S5: P2<P), the authentication unit 16 determines the server certificate 8 has already expired, immediately terminates server authentication, and goes to a standby mode (step S6). More specifically, because mutual authentication will clearly fail if the server certificate 8 has expired, the authentication unit 16 terminates connection to the external network 4 using the server certificate 8.

(2) If the Time Information is Within the Validity Period (in Second Period T2)

If in the first authentication the time P indicated by the time information 17 is in the second period T2 (step S5: P1<=P 21 =P2), the authentication unit 16 determines the first authentication succeeds and proceeds to a second authentication (step S7). More specifically, if the correct time and a valid server certificate 8 are stored, the first authentication succeeds, and the server certificate 8 is determined to be valid at the current time.

The second authentication is a process that verifies the trustworthiness of the signature or other authentication information 81, and includes detecting tampering with the authentication information 81, for example. If a problem with the authentication information 81 is not detected, the authentication unit 16 determines the second authentication succeeded. If both the first authentication and the second authentication succeed, server authentication succeeds. Additional authentication steps may also be performed and server authentication determined to succeed of those additional authentications also succeed. If the second authentication fails (step S7: failure), the authentication unit 16 terminates server authentication and goes to a standby mode (step S6). However, if server authentication succeeds (step S7: success), and client authentication done on the authentication server 7 side succeeds, mutual authentication succeeds. In this event, the external network 4 connection service starts for the printer 1 (step S8). As a result, the printer 1 can communicate with other devices on the external network 4 by encrypted communication through the communication unit 11.

Figure 6:
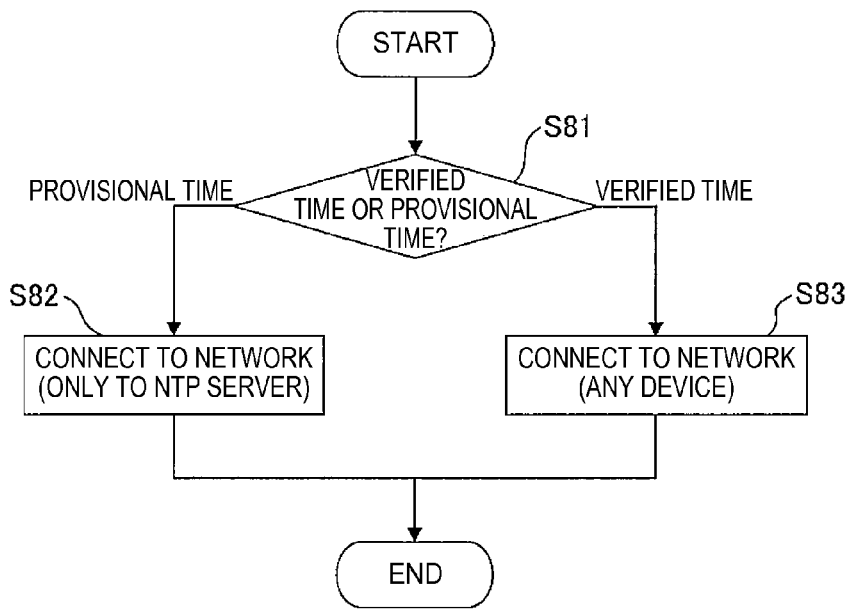
FIG. 6 is a flow chart describing the process of the communication unit when connecting to a network.

The process performed in step S8 is described in detail below with reference to FIG. 6. FIG. 6 is a flow chart of the network connection process. When mutual authentication succeeds in this embodiment, the printer 1 can connect to the external network 4 based on the status information 18. As a result, when mutual authentication succeeds, the authentication unit 16 first determines if the status information 18 is set to provisional time or verified time (step S81). If set to provisional time (step S81: provisional time), connection is restricted to the NTP server 6 on the external network 4 (step S82). If the status information 18 is set to the verified time (step S81: verified time), connection is allowed without limit to the devices on the external network 4 (step S83). More specifically, even if the time information 17 is within the validity period 82, the authentication unit 16 can only connect to the network sufficiently to synchronize the time with the NTP server 6 if the status information 18 is set to provisional time. As described below, connecting to the network with unrestricted access to other devices is allowed only when the correct current time has been acquired and the time information 17 updated accordingly.

When a connection service (a restricted connection or unrestricted connection) to the external network 4 starts in step S8, the authentication unit 16 causes the time management unit 15 to synchronize the time information 17 to the correct current time acquired from the NTP server 6. More specifically, the time management unit 15 attempts to connect to the NTP server 6 on the external network 4 (step S9). For example, the time management unit 15 reads the IP address of the NTP server 6 to connect to from the storage unit 14 and tries to connect. If the IP address of the NTP server 6 is not stored in the storage unit 14, or if connection to the specified NTP server 6 fails (step S9: failure), the correct time information cannot be acquired and server authentication based on the correct time information is not possible. In this event, therefore, the authentication unit 16 stops server authentication and goes to the standby mode (step S6).

However, if connecting to the specified NTP server 6 is successful (step S9: success), the time management unit 15 acquires accurate current time information from the NTP server 6, and executes a time updating process that synchronizes the time information 17 to the acquired current time (step S10). As a result, if the time information 17 stored in the time management unit 15 differs from the correct current time, the time difference is corrected.

When the time updating process (steps S9, S10) is executed, the time management unit 15 checks if the status information 18 is set to the provisional time or the verified time (step S11). If the status information 18 is set to provisional time (step S11: provisional time), the time management unit 15 changes the status information 18 to verified time (step S12). When the time updating process executes and the status information 18 is changed from provisional time to verified time, the authentication unit 16 goes to step S13 and interrupts the connection to the external network 4. Next, the authentication unit 16 returns to step S4, acquires the server certificate 8 again (step S4), and attempts the first authentication (step S5).

In other words, when mutual authentication succeeds with the status information 18 set to provisional time, the authentication unit 16 cuts the network connection after acquiring the correct current time, and then repeats the first authentication step using the time information 17 that has been updated to the correct current time. Note that in this event the authentication unit 16 may alternatively go from step S13 to step S5, skipping step S4 to reacquire the server certificate 8, and execute the second iteration of the first authentication using the previously acquired server certificate 8.

In the second iteration of the first authentication (step S5), the authentication unit 16 uses the correct current time acquired from the NTP server 6 for time validation of the server certificate 8. If the first authentication succeeds the second time, the second authentication also succeeds, mutual authentication therefore succeeds, control goes to step S8, and control goes to step S83 because step S81 determines the status information 18 is set to verified time (see FIG. 6).

In step S83, a connection service enabling connecting to devices on the external network 4 without limitation starts. When an unrestricted connection service starts, the time management unit 15 synchronizes the time with the NTP server 6 again (steps S9, S10). Next, because the status information 18 is determined to be set to the verified time in step S11, the startup time 19 stored in the storage unit 14 is updated (step S14).

In step S14, the time management unit 15 updates the startup time 19 to the time information 17 (that is, the current time acquired from the NTP server 6) stored by the time management unit 15. While a connection service to the external network 4 is provided, the time management unit 15 can connect to the NTP server 6 and update the time information 17 at a preset time interval (such as one hour).

Alternatively, the startup time 19 may be updated by determining the time difference between the time information 17 stored by the time management unit 15 and the startup time 19 stored in the storage unit 14, and updating the startup time 19 only if this time difference exceeds a specific time (such as 12 hours). This configuration prevents executing the startup time 19 updating process unnecessarily frequently. Increasing the processing load can therefore be suppressed. Further alternatively, if flash ROM or similar storage medium is used for the storage unit 14, the service life of the storage medium can be extended because the number of write operations to the storage medium is reduced.

(3) If the Time Information is Before the Validity Period (in the Third Period T3)

If in the first authentication the time P indicated by the time information 17 is in the third period T3 (step S5: P<P1), the time information 17 may be old because the time updating process of the time management unit 15 has not executed, for example, but the server certificate 8 may still be within the validity period 82. In this event, therefore, the authentication unit 16 first determines if the status information 18 is set to provisional time or verified time (step S15), and executes a process appropriate to the status information 18. As described above, the status information 18 is set to provisional time at startup, and is updated from provisional time to verified time when the time is synchronized with the NTP server 6 and the time information 17 has been updated to the correct current time. Therefore, if the status information 18 is set to verified time (step S15: verified time), the validity period 82 of the server certificate 8 is set to a period in the future from the current time maintained by the NTP server 6. Because such a validity period 82 is normally inconceivable, the authentication unit 16 ends server authentication and goes to the standby mode (step S6).

However, if the status information 18 is set to provisional time (step S15: provisional time), the first authentication may have failed because the time information 17 (that is, the startup time 19) is old. In this event, the authentication unit 16 executes a predefined process to attempt to succeed at mutual authentication. More specifically, the time management unit 15 executes a provisional setting process that changes the time information 17 using a predefined method (step S16). In this embodiment, this provisional setting process changes the time information 17 to information indicating a preset time (start time P1 of the validity period 82 in this example) in the validity period 82.

When the provisional setting process (step S16) executes, the authentication unit 16 proceeds to the second authentication (step S7). If the second authentication succeeds and client authentication also succeeds, mutual authentication succeeds, and the external network 4 connection service starts (step S8). In this event, because the status information 18 is set to the provisional time, only a connection to the NTP server 6 is allowed. The time management unit 15 therefore executes the time updating process (steps S9, S10) to synchronize the time information 17 to the correct current time acquired from the NTP server 6 as described above. As a result, the time information 17 set in the provisional setting process is updated to the correct current time. Next, the provisional time setting is changed to the verified time (step S12), and the connection to the external network 4 is cut (step S13). The second iteration of the first authentication (step S5) is then executed using the time information 17 updated to the correct current time.

Figure 7:
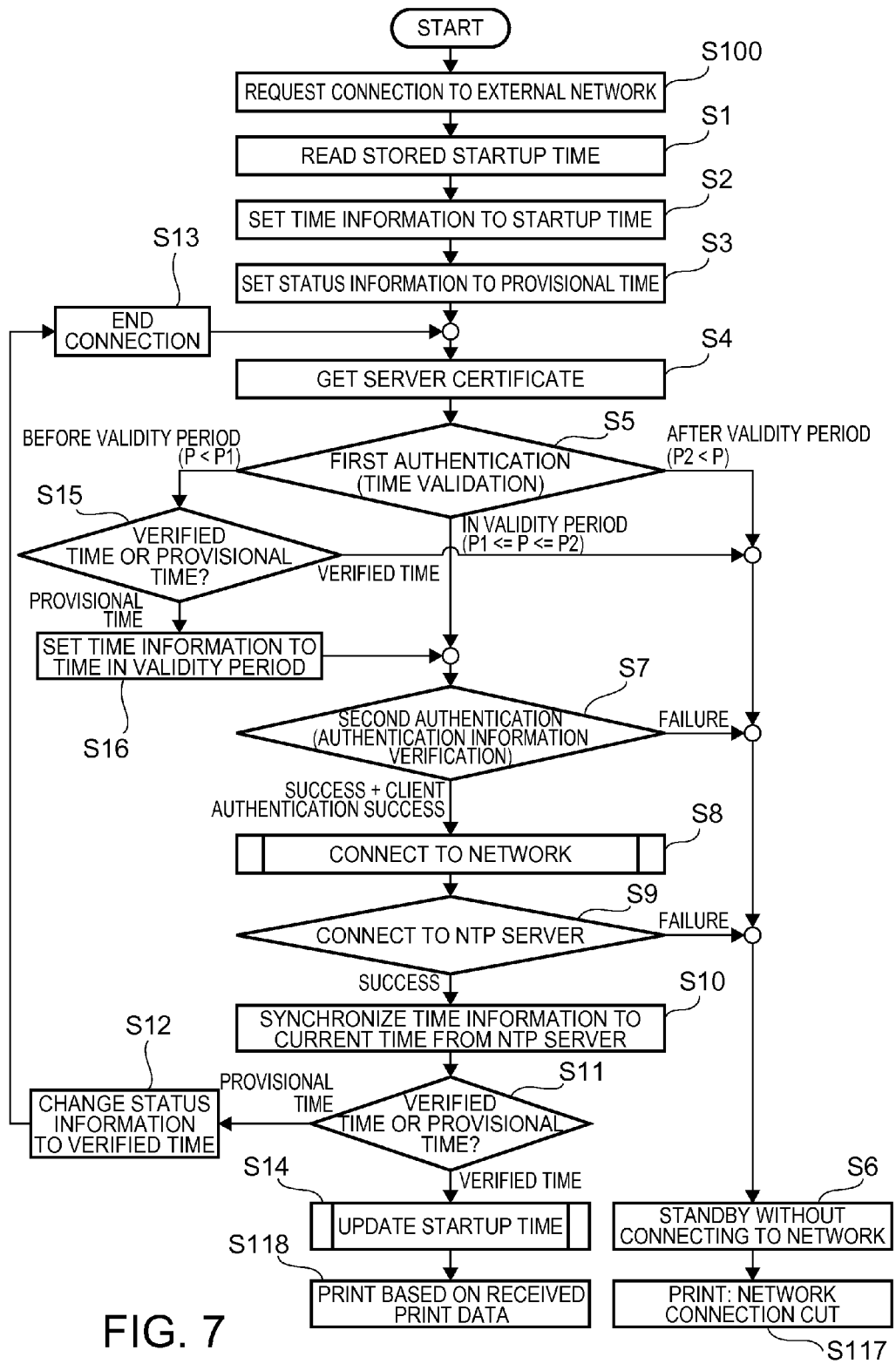
FIG. 7 is a flow chart describing the process of the printer when connecting to a network.

FIG. 7 is a flowchart of server authentication done by the printer 1, and differs from the flow chart of server authentication shown in FIG. 4 by the addition of step S100, step S117, and step S118. Steps that are the same in FIG. 7 and FIG. 4 are identified by the same step numbers.

In step S100, the control unit 13 of the printer 1 instructs the communication unit 11 to connect to the external network 4.

In step S117, if the printer 1 has gone to a standby mode without connecting to the network (step S6), the control unit 13 controls the print unit 12 to print on the print medium that authentication failed or that connection to the external network 4 was stopped based on the decision of the authentication unit 16.

If it was decided in step S5 that the server certificate 8 has already expired, the print unit 12 prints that the first authentication failed or that the certificate has expired is printed in step S117.

If it was decided in step S15 that the validity period 82 of the server certificate 8 is set to a future time, the print unit 12 prints that the validity period 82 of the server certificate 8 is unknown is printed in step S117.

If in step S7 the second authentication failed, the print unit 12 prints that the second authentication failed or that a problem with the authentication information 81 was detected is printed in step S117.

If in step S9 connection to the external network 4 failed, the print unit 12 prints that connection to the external network 4 failed or that server authentication based on correct time information is not possible is printed in step S117.

After the startup time 19 updating process (step S14), the control unit 13 controls the print unit 12 to print on the print medium based on the print data received from a device on the external network 4 in step S118. That authentication ended, or that the network connection was completed, is also printed in step S118. The number of times the first authentication executed is also printed in step S118.

As described above, the communication unit 11 (communication device) of a printer 1 according to this embodiment has a storage unit 14 that stores the startup time 19 and a server certificate 8, which is a digital certificate in which a validity period 82 is set; a time management unit 15 that sets and updates the time information 17 and status information 18; and an authentication unit 16 that inspects the server certificate 8 when connecting to an external network 4.

During server authentication, the authentication unit 16 compares the time indicated by the time information 17 with the validity period 82 of the server certificate 8 (first authentication, time validation, step S2), and executes the process most appropriate to the result.

More specifically, if the time information 17 denotes a time after the validity period 82 and the validity period 82 has clearly expired, connecting to the external network 4 using the server certificate 8 is terminated at that time and unnecessary processing is avoided. If the time information 17 is correct and the server certificate 8 is valid, the first authentication (time validation) succeeds.

If the time information 17 denotes a time before the validity period 82, and the time information 17 is old for some reason, the time information 17 may actually be within the validity period 82. As a result, a process appropriate to the status information 18 (denoting whether the time information 17 is a provisional time or verified time) is executed, and connecting to the external network 4 can be attempted.

More specifically, the time management unit 15 sets the status information 18 to verified time if the time information 17 is synchronized with the current time acquired from the NTP server 6, for example, and sets the status information 18 to provisional time if the time information 17 is set to the startup time 19.

Therefore, if the time information 17 may be old can be determined based on the status information 18. If the time information 17 may be old (if the status information 18 is set to the provisional time), the authentication unit 16 continues the process attempting to connect to the network, and if the time information is accurate (the status information 18 is set to verified time), connecting to the network is terminated because the validity period of the server certificate is clearly not possible. The validity period 82 of the server certificate 8 can therefore be inspected more accurately and efficiently than in the related art. Assuring security when connecting to the external network 4 can therefore be balanced with connecting to the network efficiently.

In this embodiment, if in the first authentication the time information 17 denotes a time before the validity period 82 and the status information 18 is set to provisional time (that is, the time information 17 is old for some reason and the correct current time may be within the validity period 82), a time within the validity period 82 is provisionally set as the time information 17 (step S16). This enables proceeding to the second authentication and attempting to connect to the external network 4. Problems such as the connection service not starting because the printer 1 does not have an internal clock or the internal clock stopped for some reason even though the server certificate 8 is valid can be avoided. There is also no need for the user to manually set the time information 17 to a value within the validity period 82. The user's work load is therefore not increased, and an increase in operating costs can be avoided.

If mutual authentication succeeds and the connection service to the external network 4 starts using the server certificate 8, this embodiment of the invention executes a time updating process that acquires the correct current time from a NTP server 6 on the external network 4 and synchronizes the time information 17 of the communication unit 11 with the correct current time (step S7). As a result, the time information 17 can be set to the correct time, and the validity period 82 of the server certificate 8 can be inspected more accurately and efficiently during server authentication. If mutual authentication succeeds, and the status information 18 is set to provisional time, a restricted connection to only the NTP server 6 is allowed. As a result, unrestricted connection to devices on the external network 4 can be avoided when mutual authentication succeeds based on time information 17 that may not be correct. The time information 17 stored by the communication unit 11 can therefore be synchronized to the correct current time while assuring security.

Furthermore, when the time updating process (step S7) executes and the status information 18 is set to verified time in this embodiment, the startup time 19 is updated to the same time as the time information 17. As a result, problems caused by the time information 17 being set to an old time at startup can thereafter be avoided. The validity period of the server certificate can therefore be inspected more accurately and efficiently.

Other Embodiments

In the embodiment described above, the communication unit 11 can acquire the correct current time by connecting to an NTP server 6 on the external network 4, but may also be able to acquire the correct current time from a path other than the external network 4. If the correct current time is acquired by such a method, the time management unit 15 executes the process of updating the time information 17 when the correct current time is acquired. Devices other than devices on the external network 4 from which the correct current time may be acquired include, for example, devices an internal clock that are connected to the local area network 2. The correct current time can therefore be acquired from such devices through the local area network 2.

Further alternatively, the communication unit 11 may have a receiver that can receive various kinds of radio signals carrying time information, including radio signals carrying GPS information, beacon signals, and time signals for radio-control timepieces, radio signals transmitted from cell phone base stations, and radio signals carrying digital television signals or multiplexed FM broadcasts. When the communication unit 11 is used in a location where such radio signals can be received, the radio signals can be received as needed to extract the current time information therefrom. When the correct current time is acquired by such methods, the time management unit 15 updates the time information 17 stored by the communication unit 11. When the time information is updated, the status information 18 is also updated from the provisional time to the verified time status. If the time information 17 is updated, the authentication unit 16 can process server authentication using the updated time information. That the time information 17 was updated to the correct current time can also be determined from the status information 18. Therefore, the validity period 82 of the server certificate 8 can be inspected more accurately and efficiently.

The disclosure being thus described, it will be obvious that it may be varied in many ways. Such variations are not to be regarded as a departure from the spirit and scope of the disclosure, and all such modifications as would be apparent to one skilled in the art are intended to be included within the scope of the following claims.

What is claimed is:

1. A control method of a communication device that performs server authentication and inspects a server certificate, which is a digital certificate with a set validity period, when connecting to a network, the control method comprising:

the communication device storing time information and status information, which indicates whether the time information is a provisional time or verified time;

doing a first authentication that determines during server authentication if the time indicated by the time information is before the start time of the validity period, during the validity period, or after the validity period ends;

stopping connecting to the network using the server certificate if the first authentication determines that the time indicated by the time information is after the validity period ends;

attempting a second authentication that inspects other authentication information included in the server certificate if the first authentication determines that the time indicated by the time information is during the validity period;

executing a preset process based on the status information if the first authentication determines that the time indicated by the time information is before the start time of the validity period and the status information is set to provisional time; and stopping connection to the network if the first authentication determines that the time indicated by the time information is before the start time of the validity period and the status information is set to verified time.

2. The control method of a communication device described in claim 1, wherein:
the preset process is a provisional setting process that sets the time information to information indicating a preset time in the validity period; and
attempts the second authentication after the provisional setting process.

3. The control method of a communication device described in claim 1, further comprising:
setting the time information to a previously stored startup time; and
setting the status information to provisional time;
before the first authentication.

4. The control method of a communication device described in claim 3, further comprising:
when connection to the network using the server certificate is enabled,
executing a time updating process that updates the time information to a current time acquired through the network, and
updating the startup time to the time information if the status information is set to verified time and the time difference between the time information and the startup time is greater than or equal to a preset threshold.

5. The control method of a communication device described in claim 1, further comprising:
when connection to the network using the server certificate is enabled,
executing a time updating process that updates the time information to a current time acquired through the network,
changing the status information to verified time if the status information is set to provisional time, and
cutting the network connection and attempting the first authentication using the updated time information.

6. The control method of a communication device described in claim 1, further comprising:
updating the time information to the received current time when information indicating the current time is received without accessing the network; and
changing the status information to verified time if the status information is set to provisional time.

7. A communication device comprising:
a processor that manages time information and status information, which indicates whether the time information is a provisional time or verified time;
the processor processing server authentication to inspect a server certificate, which is a digital certificate with a set validity period, when connecting to a network;
the processor performing a first authentication that determines during server authentication if the time indicated by the time information is before the start time of the validity period, during the validity period, or after the validity period ends;
stopping connecting to the network using the server certificate if the first authentication determines that the time indicated by the time information is after the validity period ends;
attempting a second authentication that inspects other authentication information included in the server certificate if the first authentication determines that the time indicated by the time information is during the validity period;
executing a preset process based on the status information if the first authentication determines that the time indicated by the time information is before the start time of the validity period and the status information is set to provisional time; and
stopping connection to the network if the first authentication determines that the time indicated by the time information is before the start time of the validity period and the status information is set to verified time.

8. The communication device described in claim 7, wherein:
the preset process is a provisional setting process that provisionally sets the time information to information indicating a preset time in the validity period; and
the processor attempts the second authentication after the provisional setting process.

9. The communication device described in claim 7, further comprising:
a storage that stores a preset startup time;
the processor executing a process of setting the time information to the startup time read from the storage, and a process of setting the status information to provisional time, before the first authentication.

10. The communication device described in claim 9, wherein:
when connection to the network using the server certificate is enabled, the processor
executes a time updating process of updating the time information to a current time acquired through the network, and
executes a process of updating the startup time to the time information if the status information is set to verified time and the time difference between the time information and the startup time is greater than or equal to a preset threshold.

11. The communication device described in claim 7, wherein:
when connection to the network using the server certificate is enabled, the processor
executes a time updating process of updating the time information to a current time acquired through the network, and
executes a process of changing the status information to verified time if the status information is set to provisional time; and
the processor executes a process of cutting the network connection and attempting the first authentication using the updated time information when the status information is changed to verified time.

12. The communication device described in claim 7, wherein:
the processor executes a process of updating the time information to the received current time when information indicating the current time is received without accessing the network, and
changing the status information to verified time if the status information is set to provisional time.

13. A printer comprising:
a processor that manages time information and status information, which indicates whether the time information is a provisional time or verified time, and processes server authentication to inspect a server certificate, which is a digital certificate with a set validity period, when connecting to a network;
a print unit that prints on print media based on data received through the processor;
the processor performing a first authentication that determines during server authentication if the time indicated by the time information is before the start time of the validity period, during the validity period, or after the validity period ends;

stopping connecting to the network using the server certificate if the first authentication determines that the time indicated by the time information is after the validity period ends;

attempting a second authentication that inspects other authentication information included in the server certificate if the first authentication determines that the time indicated by the time information is during the validity period;

executing a preset process based on the status information if the first authentication determines that the time indicated by the time information is before the start time of the validity period and the status information is set to provisional time; and stopping connection to the network if the first authentication determines that the time indicated by the time information is before the start time of the validity period and the status information is set to verified time.

14. The printer described in claim 13, wherein:
the preset process is a provisional setting process that provisionally sets the time information to information indicating a preset time in the validity period; and
the processor attempts the second authentication after the provisional setting process.

15. The printer described in claim 13, further comprising:
a storage that stores a preset startup time;
the processor executing a process of setting the time information to the startup time read from the storage, and a process of setting the status information to provisional time, before the first authentication.

16. The printer described in claim 13, wherein:
when connection to the network using the server certificate is enabled,
the processor executes a time updating process of updating the time information to a current time acquired through the network, and
executes a process of updating the startup time to the time information if the status information is set to verified time and the time difference between the time information and the startup time is greater than or equal to a preset threshold.

17. The printer described in claim 13, wherein:
when connection to the network using the server certificate is enabled,
the processor executes a time updating process of updating the time information to a current time acquired through the network;
executes a process of changing the status information to verified time if the status information is set to provisional time; and
executes a process of cutting the network connection and attempting the first authentication using the updated time information when the status information is changed to verified time.

18. The printer described in claim 13, wherein:
the processor executes a process of updating the time information to the received current time when information indicating the current time is received without accessing the network, and
changing the status information to verified time if the status information is set to provisional time.

19. The printer described in claim 13, wherein:
the print unit that prints a message on the print medium indicating the network connection was interrupted when the connection is interrupted.

20. The printer described in claim 13, wherein:
the print unit that when connected to the network, prints on the print medium based on print data received from a device on the network.

* * * * *